Feb. 6, 1951 — K. W. BIRKIN — 2,540,859
TANK TRUCK ASSEMBLY OF DETACHABLE
WHEEL SUPPORTED UNITS
Filed Dec. 1, 1944
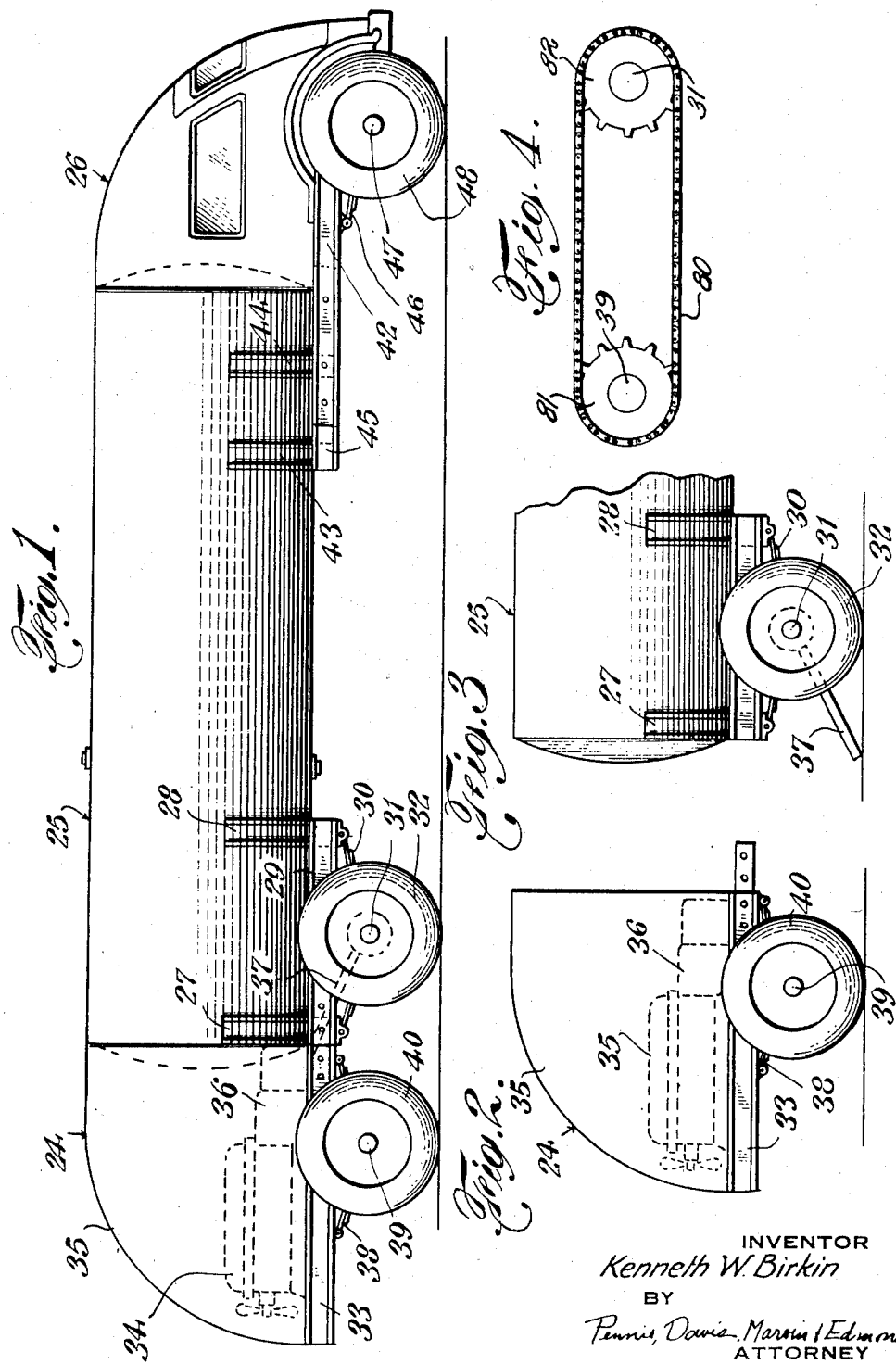
INVENTOR
Kenneth W. Birkin
BY
Pennie, Davis, Marvin & Edmonds
ATTORNEY Patented Feb. 6, 1951

2,540,859

UNITED STATES PATENT OFFICE 2,540,859

TANK TRUCK ASSEMBLY OF DETACHABLE WHEEL SUPPORTED UNITS

Kenneth W. Birkin, New York, N. Y., assignor to Sinclair Refining Company, New York, N. Y., a corporation of Maine Application December 1, 1944, Serial No. 566,151

3 Claims. (Cl. 180—11)

This invention is concerned with tank trucks of the type used for hauling large loads of liquids such as milk, petroleum products and the like, and has for its object the provision of an improved tank truck of this character. This invention aims to provide an improved tank truck with greater operating efficiency, a better distribution of the supporting structure, and with better facilities for servicing and repairing the important elements.

One of the important charactertistic features of the invention is the utilization of the tank as a chassis or frame for carrying the load and operatively interconnecting the front and rear wheels. The invention provides a tank truck with the engine and drive wheels connected to the rear end of the tank and the front wheels and cab connected to the front end of the tank. In the preferred embodiment of the invention, the engine is permanently mounted in a detachable power unit including at least one pair of rear wheels, which may easily be connected to, and disconnected from, the tank. In this construction according to the invention, the important operating parts of the truck are in the detachable power unit where most of the replacements, servicing and repairs occur, and the invention, accordingly, provides a very simple and practical means for servicing and repairing the major operating mechanism without tying up the tank, its load and the front-wheel assembly. The engine in the rear power unit may be mounted along the longitudinal axis of the tank, and is connected by known types of transmissions and connecting rods to the wheels driving the truck.

I may use a double axle for the rear, each with its own pair of wheels, one axle of which is permanently attached to the tank and the other to the power unit, together with suitable interconnecting or dual driving means for both sets of axles. In this construction, the tank is always supported on a pair of rear wheels and may be towed or otherwise suitably handled after removal of the rear power unit. In the case of the double-axle system, one axle and its wheels are connected through suspension springs to the tank and the other axle and its wheels are connected through suspension springs to the frame of the power unit. Either or both of the axles and their wheels may be driven by the engine through a suitable interconnecting drive mechanism.

These and other novel features of the invention will be better understood after considering the following discussion taken in conjunction with the accompanying drawings illustrating the preferred embodiment of the invention, in which:

Fig. 1 is the side view of a preferred form of tank truck of the invention;

Figs. 2 and 3 are fragmentary views of part of the tank truck of Fig. 1; and

Fig. 4 is a fragmentary view of the driving means for the rear unit wheels.

The tank truck illustrated in Figs. 1, 2 and 3 comprises a power unit 24, a tank 25, and a front-wheel unit 26. The tank is constructed of such rigid steel plates that it serves as its own frame for the truck. The rear end of the tank is supported upon a cradle comprising the semi-circular channel bars 27, 28 and the longitudinal channel bars 29 which rest upon the springs 30 attached to the axle 31 which drives the rear wheels 32. The tank is more or less permanently secured or mounted in the cradle and the axle 31 and wheels 32 remain with the tank. The power unit 24 comprises a frame 33 which is removably attached, as by bolts or the like, to the bars 29 of the cradle. The engine 34 is mounted on the frame 33 and has its shaft extending in the longitudinal direction of the truck. The engine, radiator, fuel supply and other miscellaneous elements necessary in the operation of an internal combustion engine are mounted under the housing 35. The transmission 36 drives the drive shaft 37 through beveled gears in the transmission and the drive shaft connects to and drives the axle 31. The drive shaft 37 not only has the usual universal joint but is telescopically connected to the transmission and is removed therefrom merely by moving the unit 24 rearward, as shown in Figs. 2 and 3.

The frame 33 rests upon the springs 38 which in turn rest upon, and are connected to, the axle 39 of the wheels 40 in the usual manner. The wheels 40 may be free running and used merely to support the unit 24 and to carry a part of the load on the wheels 32. The axle 39 and wheels 40 may, however, be driven through a chain connection 80, or the like, operatively interconnecting a sprocket wheel 81 on axle 39 with a sprocket wheel 82 on axle 31 as shown in Fig. 4. As best shown in Figs. 2 and 3, when the power unit 24 is disconnected from the tank 25, both parts remain supported on wheels. The front part of the truck comprising the tank 25 and the front-wheel unit 26 may be towed or otherwise moved around as desired. The power unit 24 may be attached to any towing vehicle for highway travel and it may be moved around the repair shop by hand.

The front-wheel unit 26 comprises a frame 42 formed of channel bars detachably connected to a cradle comprising the semi-cylindrical members 43 and 44 on which the tank 25 rests, and side rails 45. The frame 42 is preferably bolted to members 43, 44 and 45. The members 27, 28, 43 and 44 may be connected to the tank by bolts, rivets, or welding. The frame 42 is connected to, and rests upon, the front spring 46 which rests upon, and is attached to, the front axle 47 of the wheels 48 in the usual manner.

In the preferred embodiment of the invention illustrated, the transmission, shifting mechanism, the brake operating mechanism, and the fuel control mechanism or throttle are located in the cab and appropriate interconnecting means are extended to the rear to connect with their respective elements in the power units. These extensions and connections may be effected in a manner similar to those now used in busses having motors in the rear.

It is to be understood that the tank is suitably provided with filling and discharge valves, pressure relief valves and such other appurtenances as are necessary for filling the tank and discharging its liquid contents.

I claim:

1. A tank truck which comprises a tank having wheel means permanently connected thereto adjacent the rear end thereof and drive shaft means operatively engaging said wheel means; a rear unit detachably connected to said tank and having wheels connected thereto, said rear unit including power means removably connected to said drive shaft means for transmission of power to said wheel means; and a front unit detachably connected to the front of said tank and having wheels connected thereto; said tank being of sufficient rigidity to provide a proper connecting and supporting frame between the front and rear units.

2. A tank truck which comprises a front part including a front wheel unit and a rigid tank unit detachably connected thereto at the rear end thereof, said tank unit having wheel means fixedly attached at the rear end thereof; a rear wheel unit detachably connected to the rear of said tank and having power means mounted thereon; and drive shaft means detachably interconnecting said power means with said wheel means.

3. A tank truck which comprises a front part including a front wheel unit and a rigid tank unit detachably connected thereto at the rear end thereof, said tank unit having wheel means fixedly attached at the rear end thereof; a rear unit detachably connected to the rear of said tank and having power means, power transmission means connected to said power means, and wheels; drive shaft means detachably interconnecting said power means with said wheel means; and means for driving the wheels of said rear unit from said wheel means.

KENNETH W. BIRKIN.

REFERENCES CITED

The following references are of record in the file of this patent:

UNITED STATES PATENTS

| Number | Name | Date |
|---|---|---|
| 714,808 | Lemp | Dec. 2, 1902 |
| 722,262 | Stone | Mar. 10, 1903 |
| 1,149,431 | Duryea | Aug. 10, 1915 |
| 1,702,865 | Gerin | Feb. 19, 1929 |
| 1,803,866 | Patterson | May 5, 1931 |
| 1,953,515 | Smith | Apr. 3, 1934 |
| 2,011,161 | Robinson, Sr. | Aug. 13, 1935 |
| 2,026,826 | Dillon | Jan. 7, 1936 |
| 2,097,113 | Bradley | Oct. 26, 1937 |
| 2,105,302 | Thwaits | Jan. 11, 1938 |
| 2,185,030 | Lockwood | Dec. 26, 1939 |
| 2,195,509 | Buckendale | Apr. 2, 1940 |

FOREIGN PATENTS

| Number | Country | Date |
|---|---|---|
| 448,406 | Germany | Aug. 12, 1927 |
| 476,100 | Great Britain | Dec. 1, 1937 |